United States Patent [19]
Doran et al.

[11] 3,783,638
[45] Jan. 8, 1974

[54] DUAL RETAINING RING DEVICE FOR FACILITATING THE ASSEMBLY OF UNIVERSAL JOINTS

[75] Inventors: E. James Doran, Southfield, Mich.; Wallace H. Berliner, Jericho, N.Y.

[73] Assignee: Waldes Kohinoor, Inc., Long Island City, N.Y.

[22] Filed: June 9, 1972

[21] Appl. No.: 261,333

[52] U.S. Cl. ............................................. 69/17 A
[51] Int. Cl. ............................................ F16d 3/26
[58] Field of Search ............................. 64/17, 17 A

[56] References Cited
UNITED STATES PATENTS

| | | | |
|---|---|---|---|
| 2,124,803 | 7/1938 | Wollner | 64/17 A |
| 2,132,811 | 10/1938 | Wollner | 64/17 A |
| 2,228,715 | 1/1941 | Wollner | 64/17 A |
| 2,648,207 | 8/1953 | Quinn | 64/17 R |
| 2,698,527 | 1/1955 | Anderson | 64/17 A |
| 2,770,114 | 11/1956 | Slaught | 64/17 R |

*Primary Examiner*—Benjamin W. Wyche
*Assistant Examiner*—Randell Heald

[57] ABSTRACT

For use in holding two grease (bearing) cups in place on the trunnions of the cross of a universal joint prior to final clamping of a yoke thereto, a dual retaining ring device comprising two like external spring retaining rings of the radially installable type permanently secured one to the other in spaced-apart, parallel plane, coaxial, gap-aligned relationship by a substantially non-resilient strap-form bridge preferably fashioned integral with said rings and being connected to corresponding outer-edge points or portions thereof.

7 Claims, 6 Drawing Figures

PATENTED JAN 8 1974  3,783,638
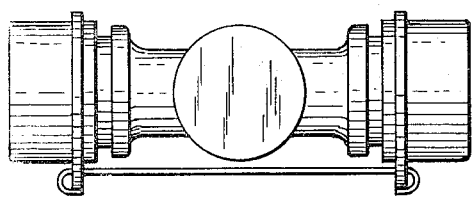
PRIOR ART  Fig.1
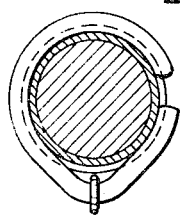
Fig.2
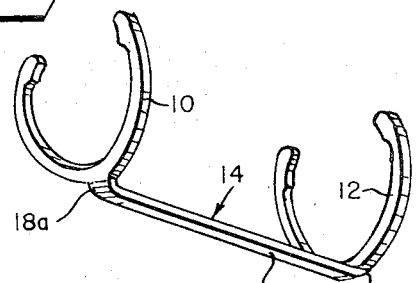
Fig.3
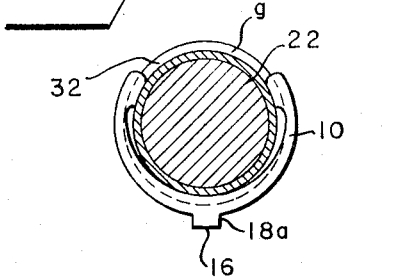
Fig.4
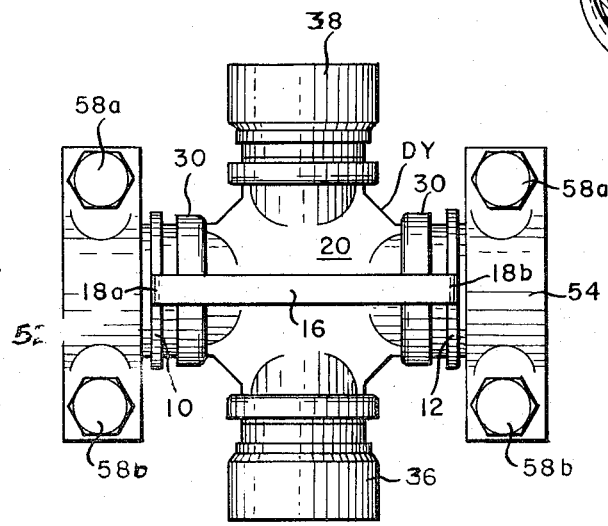
Fig.5
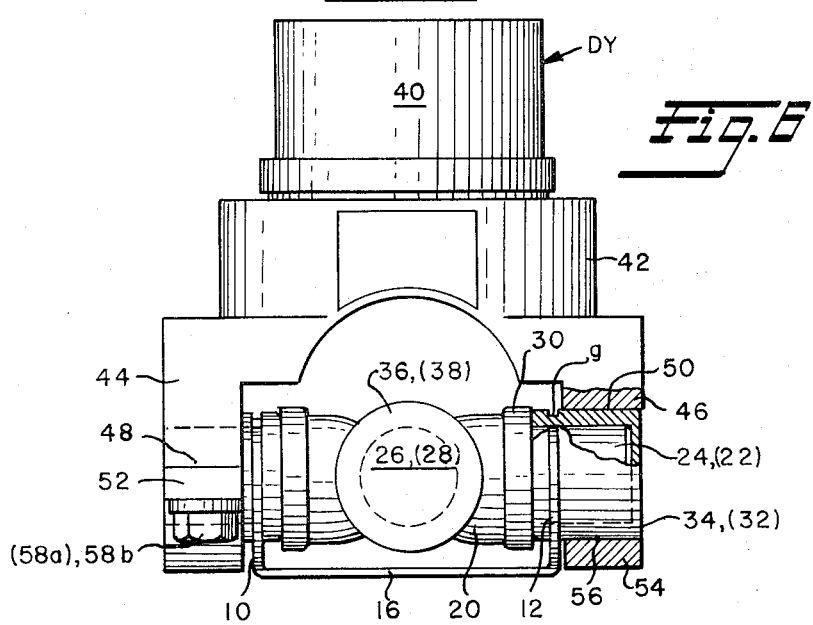
Fig.6

DUAL RETAINING RING DEVICE FOR FACILITATING THE ASSEMBLY OF UNIVERSAL JOINTS

INTRODUCTION

This invention relates to improvements in universal-joint assembling means, and more particularly to a unitary, self-contained, dual retaining ring device comprising two external spring retaining rings of the wide-gap or "open," radially installable type and/or configuration illustrated in FIGS. 7 and 8 of U.S. Pat. No. 2,491,306 are permanently joined together in parallel-plane, coaxial, ring-gap aligned relationship by a bridge member in the form of a narrow-width, substantially rigid metal strap extending between corresponding points or portions on the ring outer edges and being formed integral therewith, for use in holding two bearing or grease cups in place on the cross of a universal joint prior to final clamping of the yoke thereto.

BACKGROUND OF THE INVENTION

The present invention stems from the realization that the techniques currently used to hold the grease cups (sometimes also termed "bearing cups") to the cross of a universal joint during the course of the joint components being assembled and before final clamping of the yoke thereto, were indeed cumbersome and hardly in line with present-day advanced assembly practices. As an example, one such technique employed by a major automobile manufacturer to assemble universal joints of the type used in its automobile transmissions and which has been rendered obsolete by the present invention, required the provision of two like but wholly separate spring retaining rints, each having a "hump", i.e. a radially outwardly projecting protuberance in its arcuate ring body as provides an "eye" in its inner edge, which rings upon being brought by axial movement along the grease-cup outer surfaces to the planes of externally opening circumferential grooves provided therefor, were released thereupon to seat in said grooves. Two such ring and grease-cup sub-assemblies, with the cups disposed in opening facing relation, were mounted on the trunnions of the cross. Following such mounting (which was a preliminary mounting only), the cups were oriented to relative positions such that the "eyes" of the two separate rings were brought into axial alignment. Thereupon, the ends of a length of wire or equivalent were threaded through the ring "eyes" and said ends were then vent relatively outwardly over said humps, with the result that said length of wire provided a connecting link between the seated rings which held the grease or bearing cups on the cross-trunnions prior to and during clamping of the yoke member to the cross. Usually, despite the fact that the connecting link's only function was to hold the grease cups to the oppositely projecting cross trunnions, it was more or less conventional practice to leave said link-connected retaining rings and link mounted as aforesaid, since de-mounting thereof from the grease cups was both time-consuming and likely to result in destruction of the link.

Yet another equally cumbersome prior-art procedure and means implementing same for holding the grease and (bearing) cups on the trunnions of the cross before final clamping of the yoke to said cross, is disclosed in the U.S. Pat. to Slaght No. 2,770,114, dated Nov. 13, 1956. According to this procedure two bearing or grease cups are held in place on the trunnions of the cross, prior to clamping of the yoke to said cross, by means comprising a relatively elongate metal strap, the mid-length portion of which is welded fast to the cross in position such that the end portions of the strap, which are bent substantially at right angles to the longitudinal line of the strap proper, extend much as holding tongues into the circumferential, outwardly opening, ring grooves in the cup outer-peripheries in which conventional retaining rings are also installed. Thus, grease- or bearing-cup holding means as disclosed by Slaght requires, in additional to two separate external spring retaining rings of conventional construction, an elongate metal strap element wholly separate from said rings, weld-connected in its central length portion to the cross and whose ends are specially fabricated to provide tongues which extend into the circumferential grooves in the cup peripheries in which two conventional spring-retaining rings have already been assembled.

SUMMARY OF THE INVENTION

The present invention is predicated on the novel concept that a dual retaining-ring device comprising two external spring retaining rings of the wide-gap or "open", radially installable type which are permanently connected one to the other by a non-resilient strap-form bridging element integral with said rings and functioning to hold and/or dispose same in coaxial, spaced-apart, parallel-plane and gap-aligned relationship, may be used with great advantage and simplification of current universal joint assembly procedures, in place of the prior art grease-cup retention means described in the foregoing.

DESCRIPTION OF THE INVENTION

In the accompanying drawing illustrating a dual retaining-ring device of the invention per se, as installed, and also (FIGS. 1 and 2) against the background of a widely used prior-art form of grease— or —bearing cup retaining means which the present invention replaces; FIGS. 3 and 4 are, respectively, perspective and end views of a dual external spring retaining-ring device as herein contemplated and provided; and FIGS. 5 and 6 are views in end and part sectional side elevation of a universal joint having one of its yokes (assumed to be the swinging yoke of the joint) detached from the cross thereof to better show a dual retaining-ring device according to the present invention installed and functioning to hold the grease cups on one set of trunnions of the cross.

Referring now to the drawing, reference numerals 10 and 12 (FIG. 3) designate two identical external spring-retaining rings of the wide-gap or "open", radially installable type, which are permanently secured one to the other in coaxial, parallel-plane, and gap-aligned relationship by a bridging element 14 hereinafter termed a bridge, consisting of a narrow-width hardened metal strap 16 integrally connected to the ring outer edges via short-length, right-angularly disposed webs 18a, 18b. While the length of said bridge 14 will vary in accordance with different sizes of universal joints, it will always be such as to space the ring components 10 and 12 of the device the exact distance between the circumferential grooves provided in the peripheries of the grease or bearing cups with which the device is to be used.

It is to be understood also that said ring components 10 and 12 of the device will always have ring size adapting same to secure themselves to the bottom walls of said circumferential, outwardly opening grooves provided in the grease-cup peripheries for their reception, and further that said ring components will each have gap-width rendering same capable of being radially, rather than axially, installable in their said grooves.

Turning now to FIGS. 5 and 6 depicting a universal joint assembly having one of the yokes making up the same, illustratively the swinging yoke thereof, detached from the cross 20 to which the driving yoke is shown to be clamped, it will be understood that said cross provides right-angularly disposed pairs of coaxial, oppositely projecting trunnions designated 22, 24 and 26, 28, each terminating at its inner end in a shoulder 30. The trunnions 22, 24 and 26, 28 of the pairs thereof have mounted thereon the cylindrical cups designated 32, 34 and 36, 38 containing grease or other lubricant and which are in turn journaled in the arms or forks of the driving and swinging yokes of the joint. As is usual, said cups are each provided with an outwardly opening circumferential ring-receiving groove g.

Illustratively, a typical driving yoke DY (FIGS. 5 and 6) comprises a tubular hub 40 whose bore is preferably internally splined (splines not shown) as provides for the yoke when connected to an externally splined drive shaft or the like (also not shown) being power-driven; a cylindrical yoke body 42; diametrically opposed yoke arms or forks 44, 46 which extend axially-rearwardly from said yoke body 42 and terminate in planar end faces (one such being designated 48) each provided in its central or middle-length portion with a substantially semi-cylindrical grease or bearing-cup receiving and seating recess 50; and clamping straps 52, 54, each also provided in its central length portion with a semi-cylindrical recess 56 sized to complete an aforementioned cup-seating recess 50, said clamping straps in a final assembly step being secured to the planar end faces of the yoke arm by bolts 58a, 58b.

While the clamp straps when bolted to the yoke-arm end faces hold the grease cups in place on the trunnions of the cross in highly effective manner, it is necessary also the hold said cups in place, i.e. against outward axial movement therealong, on the trunnions of a trunnion pair prior to bolting of the clamp straps to the yoke as aforesaid. From the foregoing statement and the prior description of a dual retaining ring device of the invention and its intended function, it will be apparent that the herein-proposed dual ring device performs this necessary grease-cup holding function in highly effective manner.

In explanation, following mounting of the grease cups on the trunnions of an axially-related pair thereof, followed by assembly of the retaining ring components 10 and 12 of the herein-proposed retaining ring device as shown in FIG. 3 in the grooves g of said grease cups, said cups are positively held against any unwanted axial movement or play in either direction with respect to the trunnions by the bridge component 14 of said device, whose function it will be recalled is to securely hold the retaining ring components of said device in fixedly spaced apart relationship.

From the foregoing, it will be appreciated that a dual retaining ring device according to the present invention makes possible a universal-joint assembly procedure or technique which is practical, simple and vastly less cumbersome in practice than any comparable procedure heretofore known or proposed for holding two grease cups in place on the trunnions of the cross of a universal joint, prior to the yoke of said joint being clamped to the cross.

More particularly, the following advantages flow from a dual retaining ring constructed according to the present invention and/or are achievable in the use thereof:

a. The new dual retaining ring device comprises only one part, in contrast to the prior devices which require three separate parts to be at all effective.

b. The herein proposed dual retaining ring is installable in one simple operation, in contrast to the at least three operations required to install a functionally similar means now used by a major automobile manufacturer.

c. A dual retaining ring device according to the invention is designed to be and is in fact radially installable and hence can be assembled in the two grooves of the grease or bearing cups in place on the spaced-apart trunnions by the radial installation, i.e. radial thrust, technique, whereas the prior art devices can be installed only by the complicated axial installation procedure.

d. The assembly of a dual retaining ring device of the invention in the grooves of two spaced-apart grease cups can readily be automated, whereas the cumbersome techniques now used do not lend themselves to automation.

e. The dual retaining ring device of the present invention featuring a one-piece construction in which the dual rings thereof are held in fixed spaced-apart relation by a stiff bridging element assures a better control of the spacing between the rings, in contrast to the means of the prior art for holding the two individual rings which relies on a separate wire link providing a connection between said rings, the length of which can and usually does vary consequent to the looping of the ends thereof to and about the ring body, and the alternate means described in the foregoing which depends on the operation of somehow or another welding a strap member to the cross of a universal joint.

f. The dual retaining ring device of the invention can be disassembled from the cups which it normally holds in place on the trunnions with approximately the same ease that characterizes its assembly thereto, and when so disassembled, can be used over and over again if necessary.

Having disclosed my invention and the many advantages achievable in the use thereof,

I claim:

1. For use in holding two axially spaced-apart grease-containing or bearing cups each having an outwardly-opening ring-receiving circumferential groove in its periphery, in place on axially spaced-apart trunnions of the cross of a universal joint, a dual-retaining ring device comprising two like external spring retaining rings of the wide-gap or "open", radially installable type, and means integral with and permanently connecting said rings one to the other in coaxial, spaced-apart, parallel-plane and gap-aligned relationship enabling their substantially simultaneous mounting and demounting from the cup grooves.

2. A dual retaining ring device according to claim 1, wherein said means comprises a strap-form, substantially non-resilient bridge extending between said rings, said bridge having length such as to space said rings a predetermined distance corresponding to the spacing between the grooves of the grease cups in which said rings are to be received.

3. A dual retaining ring device according to claim 2, wherein said bridge is connected to the ring outer edges by means of short-length, right-angularly disposed webs extending from the ends of said bridge to corresponding short-arcuate-length portions of said ring outer-edges.

4. A universal joint including a conventional universal-joint cross having oppositely disposed, coaxially related trunnions, grease cups mounted on said trunnions each having an outwardly opening, circumferential ring-receiving groove in its periphery, and a dual retaining ring device holding said cups in place on said trunnions, said device comprising two like wide-gap external spring retaining rings spring-seated in said groove, and means integral with and permanently connecting said rings one to the other in gap-aligned, parallel-plane and axially spaced-apart relationship which is such as to space said rings the exact distance between the grooves of said grease cups.

5. A universal joint including a conventional universal-joint cross having oppositely disposed, coaxially related trunnions, grease cups mounted on said trunnions each having an outwardly opening, circumferential ring-receiving groove in its periphery, and a dual retaining ring device holding said cups in place on said trunnions, said device comprising two like wide-gap external spring retaining rings spring-seated in said groove, and means integral with and permanently connecting said rings one to the other in spaced-apart relationship which is such as to space said rings the exact distance between the grooves of said grease cups, wherein said ring-connecting means comprises a strap-form bridge connected at its ends to outer-edge portions of said rings and disposing same in coaxial parallel-plane and gap-aligned relationship.

6. In a universal joint, a cross having pairs of oppositely extending, axially aligned trunnions disposed on intersecting axes, grease cups fitted to and mounted on said trunnions and having external, full-circumferential ring-receiving grooves provided in their respective peripheries, the grease cups mounted on a trunnion pair opening towards one another, and means retaining said cups in place on the trunnions of said pair prior to and wholly independently of the clamping of said cross to the forks of a yoke conventionally associated therewith comprising a unitary dual retaining ring device comprising two like external spring retaining rings of the radially installable type spring-seated in the grooves of the so-mounted grease cups, and a substantially non-resilient bridge extending between said two rings and being integrally connected thereto at points along the ring outer edges, said bridge maintaining said rings in permanent parallel-plane, coaxial and gap-aligned relationship.

7. In a universal joint according to claim 6, said bridge comprising an elongate, narrow-width non-resilient strap of length corresponding to the axial spacing between the grooves of the so-mounted cups and terminating at its ends in short-length integral webs extending at a right angle to the strap proper and being integrally connected to outer-edge portions of said rings.

* * * * *